United States Patent
Sakuta

(10) Patent No.: US 12,522,620 B2
(45) Date of Patent: Jan. 13, 2026

(54) ISOCYANATE GROUP-CONTAINING ORGANOSILICON COMPOUND AND METHOD FOR PRODUCING ISOCYANATE GROUP-CONTAINING ORGANOSILICON COMPOUND

(71) Applicant: SHIN-ETSU CHEMICAL CO., LTD., Tokyo (JP)

(72) Inventor: Koji Sakuta, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 551 days.

(21) Appl. No.: 17/799,133

(22) PCT Filed: Feb. 5, 2021

(86) PCT No.: PCT/JP2021/004297
§ 371 (c)(1),
(2) Date: Aug. 11, 2022

(87) PCT Pub. No.: WO2021/171962
PCT Pub. Date: Sep. 2, 2021

(65) Prior Publication Data
US 2023/0098950 A1    Mar. 30, 2023

(30) Foreign Application Priority Data

Feb. 27, 2020   (JP) ................. 2020-032292

(51) Int. Cl.
*C07F 7/10*   (2006.01)
*C08G 77/12*  (2006.01)
*C08G 77/20*  (2006.01)

(52) U.S. Cl.
CPC ..................... *C07F 7/10* (2013.01)

(58) Field of Classification Search
CPC .......... C07F 7/0838; C07F 7/10; C08G 77/26; C08G 77/12; C08G 77/20
See application file for complete search history.

(56) References Cited

U.S. PATENT DOCUMENTS 5,703,159 A * 12/1997 Ichinohe ................ C08G 77/50
                                                    525/440.03
2013/0197139 A1   8/2013  Kobayashi et al.
2018/0362716 A1  12/2018  Okamura
2019/0256663 A1   8/2019  Hagiwara

FOREIGN PATENT DOCUMENTS

| CN | 103224709 A | 7/2013 |
|---|---|---|
| CN | 108473513 A | 8/2018 |
| CN | 110172110 A | 8/2019 |
| JP | H06-228161 A | 8/1994 |
| JP | H08-104755 A | 4/1996 |
| JP | H08-157728 A | 6/1996 |
| JP | H08-164679 A | 6/1996 |
| JP | 2001-026593 A | 1/2001 |
| JP | 2018-097154 A | 6/2018 |

OTHER PUBLICATIONS

Jan. 19, 2024 Extended European Seach Report European Patent Application No. 21760971.8.
Apr. 6, 2021 International Search Report issued in International Patent Application No. PCT/JP2021/004297.
Aug. 30, 2022 International Preliminary Report on Patentability issued in International Patent Application No. PCT/JP2021/004297.
Doherty et al.; "Small Molecule Cyclic Amide and Urea Based Thickeners for Organic and sc-CO2/Organic Solutions"; Energy 2016; vol. 30; No. 7; pp. 5601-5610.
Feb. 5, 2024 Search Report issued in Chinese Patent Application No. 202180016123.2.

* cited by examiner

*Primary Examiner* — Alexander R Pagano
*Assistant Examiner* — Frank S. Hou
(74) *Attorney, Agent, or Firm* — Oliff PLC

(57) ABSTRACT

An isocyanate group-containing organosilicon compound shown by the following general formula (1). This provides an organosilicon compound having only one isocyanate group, which is highly reactive, in a molecule and having two or three organopolysiloxane groups per molecule. In the formula (1), each $R^1$ is identical to or different from one another, represents a monovalent alkyl group having 1 to 10 carbon atoms or a phenyl group, and has no aliphatic unsaturated group; each $R^2$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; "a" represents 0 or 1; and "b" represents an integer of 0 to 300.

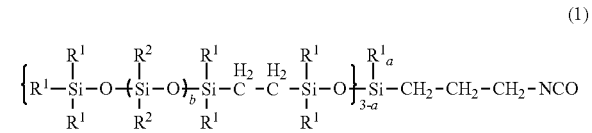

(1)

4 Claims, No Drawings

ISOCYANATE GROUP-CONTAINING ORGANOSILICON COMPOUND AND METHOD FOR PRODUCING ISOCYANATE GROUP-CONTAINING ORGANOSILICON COMPOUND

TECHNICAL FIELD

The present invention relates to an organosilicon compound having organopolysiloxane groups and an isocyanate group in one molecule.

BACKGROUND ART

An isocyanate group can form urethane bond or urea bond by reaction with an organic functional group, such as a hydroxyl group and an amino group, having active hydrogen. Compounds having a polysiloxane group in combination with the high reactivity of an isocyanate group are useful as modifying agents for organic compounds, as synthetic materials and modifiers for various polymers, and as surface treatment agents.

Traditionally, such compounds having an isocyanate group have been produced by reaction between an amine compound and phosgene in industrial scales. However, when an isocyanate is formed from a polysiloxane having an amino group and phosgene, the siloxane bond is cleaved by hydrochloric acid formed as a by-product, and the target products cannot be obtained in high yield. Hence, methods have been proposed to synthesize a polysiloxane compound having an isocyanate group without using phosgene (Patent Documents 1, 2).

Patent Documents 1, 3 describe γ-tris(trimethylsiloxy) silylpropyl isocyanate as a specific example of polysiloxane having an isocyanate group. However, this polysiloxane has a structure with branched tetrasiloxane backbone. Even when this compound is used to modify various polymers or for other usages, it is difficult to obtain sufficient modification effects such as improvements in smoothness and wear resistance because the siloxane unit is short.

Patent Document 2 describes an organosilicon compound having one isocyanate group and one vinyl group per molecule, and an addition reaction between this vinyl group and a polysiloxane having hydrogen at one terminal makes it possible to obtain a polysiloxane having just one isocyanate group in a molecule. In this event, changing the degree of polymerization of the polysiloxane having hydrogen at one terminal involved in the addition reaction makes it easy to obtain the modification effect by the polysiloxane when the isocyanate group is utilized to modify various polymers, for example.

The polysiloxane having hydrogen at one terminal can be synthesized by: subjecting hexamethylcyclotrisiloxane to living anionic polymerization with an initiator of an alkyl metal salt such as butyllithium; and blocking the polymer terminal with dimethylchlorosilane. However, as a disadvantage of the living anionic polymerization, if the degree of polymerization is set higher, side reactions such as inactivation at the growing terminal are likely to occur, consequently decreasing the terminal blocking ratio. In contrast, with a compound containing multiple, that is, two or three polysiloxane groups per molecule, it is possible to set the degree of polymerization lower per polysiloxane group. Such a compound is expected to be useful as a modifier for various polymers.

CITATION LIST

Patent Literature

Patent Document 1: JP 2001-026593 A
Patent Document 2: JP H08-104755 A
Patent Document 3: JP P06-228161 A

SUMMARY OF INVENTION

Technical Problem

The present invention has been made in view of such circumstances. An object of the present invention is to provide an organosilicon compound having only one isocyanate group which is highly reactive, in a molecule and having two or three organopolysiloxane groups per molecule.

Solution to Problem

To achieve the object, the present invention provides an isocyanate group-containing organosilicon compound shown by the following general formula (1),

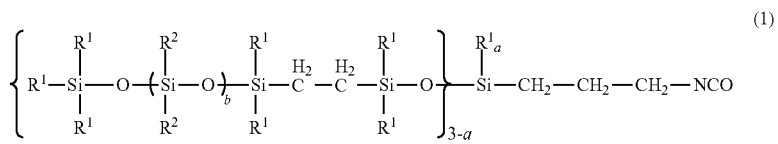

wherein each $R^1$ is identical to or different from one another, represents a monovalent alkyl group having 1 to 10 carbon atoms or a phenyl group, and has no aliphatic unsaturated group; each $R^2$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; "a" represents 0 or 1; and "b" represents an integer of 0 to 300.

Such a compound is an organosilicon compound having only one highly-reactive isocyanate group in a molecule and having two or three organopolysiloxane groups per molecule, and is useful for various applications.

Moreover, the present invention provides an isocyanate group-containing organosilicon compound comprising an addition reaction product between an organosilicon compound shown by the following general formula (2) and an organohydrogenpolysiloxane shown by the following general formula (3),

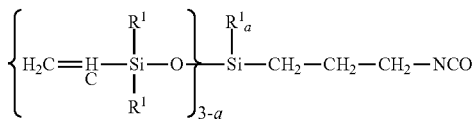

(2)

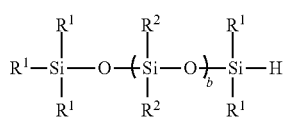

(3)

wherein R¹, R², "a", and "b" are as defined above.

With such a compound, it is possible to obtain an organosilicon compound having only one highly-reactive an isocyanate group per molecule and two or three organopolysiloxane groups per molecule.

Further, the present invention provides a method for producing an isocyanate group-containing organosilicon compound, the method comprising performing an addition reaction be an organosilicon compound shown by the general formula (2) and an organohydrogenpolysiloxane shown by the general formula (3).

Such a compound production method makes it possible to efficiently obtain an organosilicon compound having only one highly-reactive isocyanate group and two or three organopolysiloxane groups per molecule.

Advantageous Effects of Invention

As described above, the inventive organosilicon compound is characterized by having just one isocyanate group, which is highly reactive with a hydroxyl group and an amino group, per molecule and having two or three organopolysiloxane groups per molecule. The inventive organosilicon compound is useful as a modifying agent for organic compounds, a synthetic material and a modifier for various polymers, and a surface treatment agent.

DESCRIPTION OF EMBODIMENTS

As noted above, there have been demands for the development of an organosilicon compound having only one highly-reactive isocyanate group in a molecule and having two or three organopolysiloxane groups per molecule.

The present inventor and colleagues have earnestly studied to achieve the above object and consequently found an isocyanate group-containing organosilicon compound having the following particular structure. This finding has led to the present invention.

Specifically, the present invention is an isocyanate group-containing organosilicon compound shown by the following general formula (1),

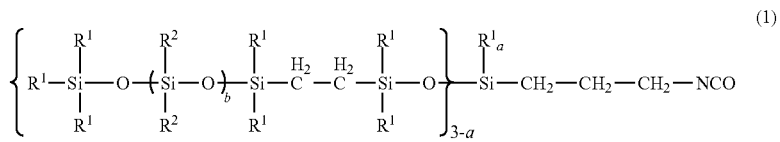

(1)

wherein each R¹ is identical to or different from one another, represents a monovalent alkyl group having 1 to 10 carbon atoms or a phenyl group, and has no aliphatic unsaturated group; each R² is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; "a" represents 0 or 1; and "b" represents an integer of 0 to 300.

Hereinafter, the present invention will be described in detail, but the present invention is not limited thereto.

An isocyanate group-containing organosilicon compound of the present invention is shown by the following general formula (1).

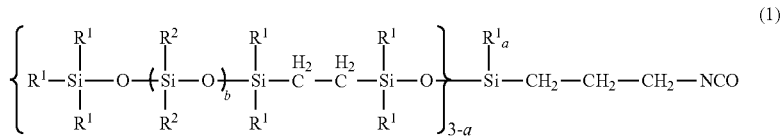

(1)

Here, each $R^1$ is identical to or different from one another, represents a monovalent alkyl group having 1 to 10 carbon atoms or a phenyl group, and has no aliphatic unsaturated group. Each $R^2$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group. "a" represents 0 or 1. "b" represents an integer of 0 to 300.

Note that the viscosity is measured at 25° C. by using a modified Ostwald capillary viscometer.

$R^1$'s are identical to or different from one another, and are each a monovalent alkyl group having 1 to 10 carbon atoms, or a phenyl group, but do not have an aliphatic unsaturated group. The $R^1$ may be linear, branched, or cyclic. Specific examples thereof can include: alkyl groups, such as a methyl group, an ethyl group, a propyl group, a butyl group, a pentyl group, a hexyl group, a heptyl group, an octyl group, a nonyl group, and a decyl group; saturated alicyclic hydrocarbon groups, such as a cyclopentyl group and a cyclohexyl group; and a phenyl group. $R^1$ is preferably a methyl group, an ethyl group, a butyl group, or a phenyl group.

$R^2$'s are identical to or different from one another, and are each a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, but do not have an aliphatic unsaturated group. The $R^2$ may be linear, branched, or cyclic. Specific examples thereof can include: alkyl groups, such as a methyl group, an ethyl group, a propyl group, a butyl group, a pentyl group, a hexyl group, a heptyl group, an octyl group, a nonyl group, and a decyl group; saturated alicyclic hydrocarbon groups, such as a cyclopentyl group and a cyclohexyl group; an aryl groups, such as a phenyl group and a tolyl group; aralkyl groups, such as a benzyl group and a phenylethyl group; fluorine-substituted alkyl groups, such as a trifluoropropyl group and a nonaflorohexyl group; etc. $R^2$ is preferably a methyl group or a phenyl group.

"a" is 0 or 1. "b" is 0 to 300, preferably 1 to 200, more preferably 2 to 100. If "b" exceeds 300, the amount of unreacted organopolysiloxane is increased, which makes it difficult to obtain high-purity product.

The inventive isocyanate group-containing organosilicon compound can be obtained by an addition reaction, such as hydrosilylation, between an organosilicon compound having a vinyl group and an isocyanate group shown by the following general formula (2) and an organohydrogenpolysiloxane shown by the following general formula (3) in the presence of a platinum-based catalyst. Here, $R^1$, $R^2$, "a", and "b" are as defined above.

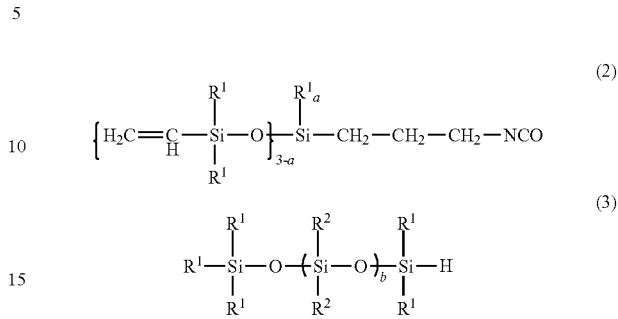

In this manner, the inventive isocyanate group-containing organosilicon compound can be an isocyanate group-containing organosilicon compound characterized by being an addition reaction product between an organosilicon compound shown by the general formula (2) and an organohydrogenpolysiloxane shown by the general formula (3).

The organosilicon compound of the general formula (2) used in the addition reaction can be obtained by forming an isocyanate compound from an amino group-containing organosilicon compound shown by the following general formula (4) according to a known method. In a preferable method, after the amino group is converted to a carbamic acid phenyl ester, the isocyanate formation is performed through thermal decomposition reaction in the presence of an acid scavenger and a trialkylchlorosilane disclosed in Patent Document 2 mentioned above.

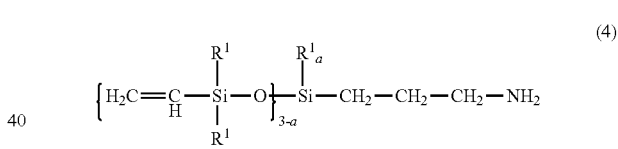

Further, the amino group-containing organosilicon compound of the general formula (4) can be obtained by transesterification between a primary amino group-containing alkoxysilane and a vinyl group-containing organosilanol as described in Patent Document 3 and as shown in the following formula (5).

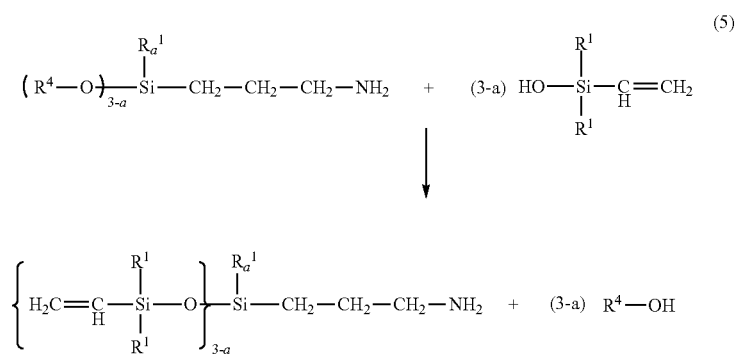

Here, R¹ is as defined above, and R⁴ represents a methyl group or an ethyl group.

The addition reaction performed in the presence of a platinum-based catalyst does not necessarily require a solvent, or may employ a hydrocarbon solvent, such as isooctane, toluene, and xylene; an ether solvent, such as tetrahydrofuran, dibutyl ether, monoglyme, and diglyme; or an aprotic solvent, such as dimethylformamide, dimethylacetamide, dimethylsulfoxide, and dimethylimidazolidinone.

EXAMPLE

Hereinafter, the present invention will be specifically described with reference to Examples. However, the present invention is not limited thereto.

Additionally, each viscosity was measured at a temperature of 25° C. with a modified Ostwald capillary viscometer.

Synthesis Example 1

After a flask was purged with nitrogen, 179.0 g of 3-aminopropyl-trimethoxysilane and 4.8 g of tetrakis(2,4-petanedionato)zirconium(IV) were placed therein and heated, so that the inner temperature reached 70° C. To the resultant, 459.0 g of dimethylvinylsilanol was added dropwise over 1 hour. After the completion of the dropwise addition, the resultant was further stirred at 90° C. for 3 hours. Then, distillation was performed under reduced pressure. Thus, 255.6 g of tris(dimethylvinylsiloxy)-3-aminopropylsilane shown by the following formula (6) was obtained. The boiling point was 102.0 to 102.5° C./300 Pa, and the purity was 99.5% according to the gas chromatography analysis.

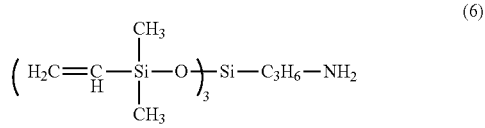

(6)

Synthesis Example 2

After a flask was purged with nitrogen, 109.8 g of diphenyl carbonate and 100.0 g of toluene were introduced therein and heated, so that the inner temperature reached 50° C. To the resultant, 190.0 g of the aminosilane shown by the formula (6) was added dropwise over 15 minutes. After the completion of the dropwise addition, the resultant was further stirred at 100° C. for 3 hours. The reaction product was transferred to a distillation flask and heated for 2 hours, so that the inner temperature reached 140 to 150° C. In this event, the degree of vacuum was being adjusted to 3000 to 5000 Pa. After air-cooling until the inner temperature reached 100° C. or less, distillation was performed under reduced pressure. Thus, 202.5 g of tris(dimethylvinylsiloxy)-3-isocyanatepropylsilane shown by the following formula (7) was obtained. The boiling point was 125.0 to 127.0/300 Pa, and the purity was 99.1% according to the gas chromatography analysis.

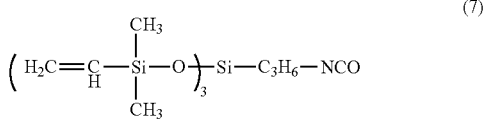

(7)

Synthesis Example 3

After a flask was purged with nitrogen, 191.0 g of 3-aminopropylmethyldiethoxysilane and 3.0 g of dibutyltin dilaurate were placed therein and heated, so that the inner temperature reached 70° C. To the resultant, 439.5 of dimethylvinylsilanol was added dropwise over 1 hour. After the completion of the dropwise addition, the resultant was further stirred at 90° C. for 3 hours. Then, distillation was performed under reduced pressure. Thus, 187.1 g of bis(dimethylvinylsiloxy)-3-aminopropylmethylsilane shown by the following formula (8) was obtained. The boiling point was 81.0 to 81.5° C./300 Pa, and the purity was 99.3% according to the gas chromatography analysis.

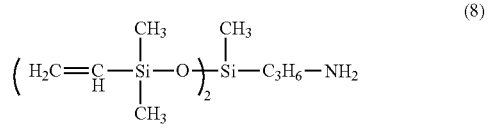

(8)

Synthesis Example 4

After a flask was purged with nitrogen, 60.5 g of diphenyl carbonate and 50.0 g of toluene were introduced therein and heated, so that the inner temperature reached 60° C. To the resultant, 84.0 g of the aminosilane shown by the formula (8) was added dropwise over 15 minutes. After the completion of the dropwise addition, the resultant was further stirred at 100° C. for 3 hours. The reaction product was transferred to a distillation flask and heated for 2 hours, so that the inner temperature reached 140 to 150° C. In this event, the degree of vacuum was being adjusted to 3000 to 5000 Pa. After air-cooling until the inner temperature reached 100° C. or less, distillation was performed under reduced pressure. Thus, 49.3 g of bis(dimethylvinylsiloxy)-3-isocyanatepropylmethylsilane shown by the following formula (9) was obtained. The boiling point was 93.0 to 9.4.0° C./300 Pa, and the purity was 99.9% according to the gas chromatography analysis.

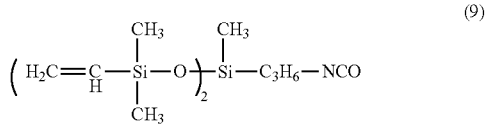

(9)

Example 1

After a flask was purged with nitrogen, 24.5 g of the vinyl group-containing isocyanate siloxane shown by the formula (7) and 72.4 g of an organohydrogenpolysiloxane shown by the following formula (10) were in therein. 0.02 g of a Karstedt catalyst (platinum concentration: 3%) was added and stirred at 100° C. for 4 hours. The unreacted materials were distilled off by heating under reduced pressure. Thus, 95.9 g of an isocyanate group-containing organopolysiloxane shown by the following formula (11) was obtained. It was a colorless transparent liquid, the viscosity at 25° C. was 18.4 mm²/s, and the isocyanate equivalent weight was 1740 g/mol.

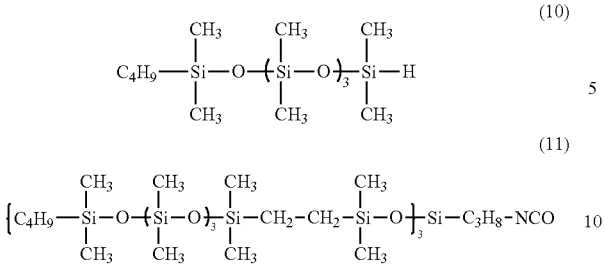

(10)

(11)

Example 2

After a flask was purged with nitrogen, 47.2 g of the vinyl group-containing isocyanate siloxane shown by the formula (7), 261.5 g of an organohydrogenpolysiloxane shown by the following formula (12), and 30.0 g of toluene were introduced therein. 0.04 g of a Karstedt catalyst (platinum concentration: 3%) was added and stirred at 100° C. for 4 hours. The unreacted materials were distilled off by heating under reduced pressure. Thus, 302.5 g of an isocyanate group-containing organopolysiloxane shown by the following formula (13) was obtained. It was a colorless transparent liquid, the viscosity at 25° C. was 28.4 mm$^2$/s, and the isocyanate equivalent weight was 2710 g/mol.

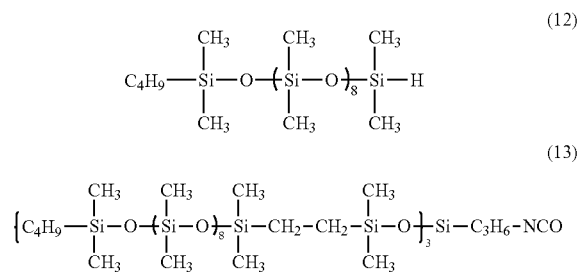

(12)

(13)

Example 3

After a flask was purged with nitrogen, 3.3 g of the vinyl group-containing isocyanate siloxane shown by the formula (9), 42.9 g of an organohydrogenpolysiloxane shown by the following formula (14), and 10.0 g of toluene were introduced therein. 0.01 g of a Karstedt catalyst (platinum concentration: 3%) was added and stirred at 100° C. for 4 hours. The unreacted materials were distilled off by heating under reduced pressure. Thus, 45.3 g of an isocyanate group-containing organopolysiloxane shown by the following formula (15) was obtained. It was a colorless transparent liquid, the viscosity at 25° C. was 65.4 mm$^2$/s, and the isocyanate equivalent weight was 5750 g/mol.

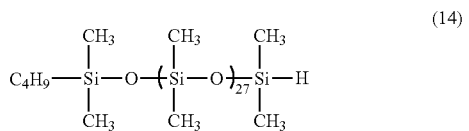

(14)

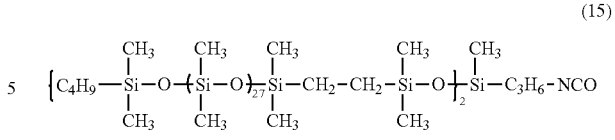

(15)

Example 4

After a flask was purged with nitrogen, 1.6 g of the vinyl group-containing isocyanate siloxane shown by the formula (9), 40.7 g of an organohydrogenpolysiloxane shown by the following formula (16), and 20.0 g of toluene were introduced therein. 0.01 g of a Karstedt catalyst (platinum concentration: 3%) was added and stirred at 100° C. for 4 hours. The unreacted materials were distilled off by heating under reduced pressure. Thus, 42.0 g of an isocyanate group-containing organopolysiloxane shown by the following formula (17) was obtained. It was a colorless transparent liquid, the viscosity at 25° C. was 126 mm$^2$/s, and the isocyanate equivalent weight was 10800 g/mol.

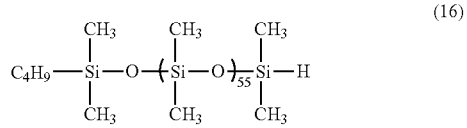

(16)

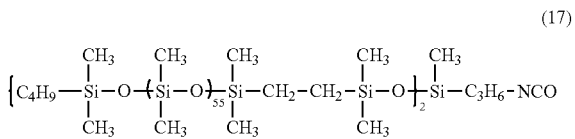

(17)

As described above, the present invention makes it possible to obtain organosilicon compounds having only one highly-reactive isocyanate group and two or three organopolysiloxane groups per molecule. Moreover, the inventive organosilicon compounds have two or three organopolysiloxane groups per molecule, and are capable setting the degree of polymerization low in one polysiloxane group. Thus, the compounds are useful as modifiers for various polymers, etc.

It should be noted that the present invention is not limited to the above-described embodiments. The embodiments are just examples, and any embodiments that substantially have the same feature and demonstrate the same functions and effects as those in the technical concept disclosed in claims of the present invention are included in the technical scope of the present invention.

The invention claimed is:
1. An isocyanate group-containing organosilicon compound shown by the following general formula (1),

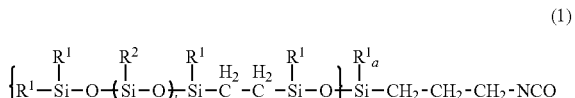

(1)

wherein each $R^1$ is identical to or different from one another, represents a monovalent alkyl group having 1 to 10 carbon atoms or a phenyl group, and has no aliphatic unsaturated group; each $R^2$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; "a" represents 0 or 1; and "b" represents an integer of 0 or more to less than 10.

2. The isocyanate group-containing organosilicon compound according to claim 1 prepared by reaction between an organosilicon compound shown by the following general formula (2) and an organohydrogenpolysiloxane shown by the following general formula (3),

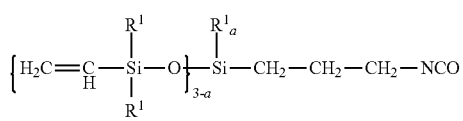
(2)

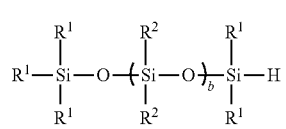
(3)

wherein $R^1$, $R^2$, "a", and "b" are as defined above.

3. A method for producing the isocyanate group-containing organosilicon compound according to claim 1, the method comprising performing an addition reaction between an organosilicon compound shown by the following general formula (2) and an organohydrogenpolysiloxane shown by the following general formula (3),

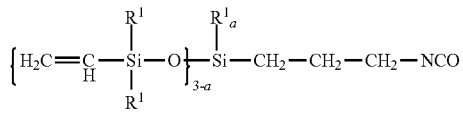
(2)

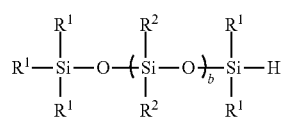
(3)

wherein each $R^1$ is identical to or different from one another, represents a monovalent alkyl group having 1 to 10 carbon atoms or a phenyl group, and has no aliphatic unsaturated group; each $R^2$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; "a" represents 0 or 1; and "b" represents an integer of 0 or more to less than 10.

4. A method for producing the isocyanate group-containing organosilicon compound according to claim 2, the method comprising performing an addition reaction between an organosilicon compound shown by the following general formula (2) and an organohydrogenpolysiloxane shown by the following general formula (3),

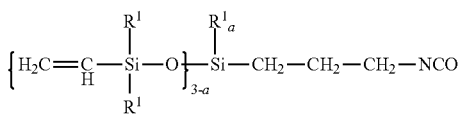
(2)

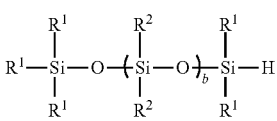
(3)

wherein each $R^1$ is identical to or different from one another, represents a monovalent alkyl group having 1 to 10 carbon atoms or a phenyl group, and has no aliphatic unsaturated group; each $R^2$ is identical to or different from one another, represents a monovalent alkyl group having 1 to 10 carbon atoms, a fluorine-substituted alkyl group, a monovalent aryl group having 6 to 10 carbon atoms, or a monovalent aralkyl group having 7 to 10 carbon atoms, and has no aliphatic unsaturated group; "a" represents 0 or 1; and "b" represents an integer of 0 or more to less than 10.

* * * * *